United States Patent
Nishida et al.

(10) Patent No.: US 11,111,391 B2
(45) Date of Patent: Sep. 7, 2021

(54) COATED MAGNESIUM OXIDE PARTICLES AND METHOD OF PRODUCING THE SAME, AND THERMAL CONDUCTIVE RESIN COMPOSITION

(71) Applicant: Ube Material Industries, Ltd., Ube (JP)

(72) Inventors: Naoto Nishida, Ube (JP); Koji Nakamura, Ube (JP); Seiji Yamaguchi, Ube (JP)

(73) Assignee: Ube Material Industries, Ltd.

( * ) Notice: Subject to any disclaimer, the term of this patent is extended or adjusted under 35 U.S.C. 154(b) by 15 days.

(21) Appl. No.: 16/580,101

(22) Filed: Sep. 24, 2019

(65) Prior Publication Data
US 2020/0017692 A1 Jan. 16, 2020

Related U.S. Application Data

(63) Continuation of application No. PCT/JP2018/007220, filed on Feb. 27, 2018.

(30) Foreign Application Priority Data

Mar. 28, 2017 (JP) .............................. JP2017-063552

(51) Int. Cl.
| | |
|---|---|
| *C09C 3/08* | (2006.01) |
| *C08L 101/00* | (2006.01) |
| *C08K 3/013* | (2018.01) |
| *C08K 5/09* | (2006.01) |
| *C08K 9/06* | (2006.01) |
| *C08K 5/54* | (2006.01) |
| *C08K 3/22* | (2006.01) |

(52) U.S. Cl.
CPC ................ *C09C 3/08* (2013.01); *C08K 3/013* (2018.01); *C08K 5/09* (2013.01); *C08K 5/5403* (2013.01); *C08K 9/06* (2013.01); *C08L 101/00* (2013.01); *C01P 2004/32* (2013.01); *C01P 2004/51* (2013.01); *C01P 2006/19* (2013.01); *C08K 2003/2217* (2013.01); *C08K 2201/001* (2013.01); *C08L 2203/20* (2013.01)

(58) Field of Classification Search
CPC .......................... C01F 5/02; C08K 2003/2217
See application file for complete search history.

(56) References Cited

U.S. PATENT DOCUMENTS

| | | | |
|---|---|---|---|
| 3,362,970 A | 1/1968 | Patton | |
| 2016/0053073 A1* | 2/2016 | Matsui | C01F 5/22 523/200 |

FOREIGN PATENT DOCUMENTS

| | | | |
|---|---|---|---|
| EP | 2980021 A1 | 2/2016 | |
| JP | H06-171928 A | 6/1994 | |
| JP | 2016-088838 A | 5/2016 | |
| WO | WO-2005-033214 A1 | 4/2005 | |
| WO | WO-2005033214 A1 * | 4/2005 | ........... H05K 1/0373 |

OTHER PUBLICATIONS

Machine translation WO2005/033214 (Year: 2005).*

* cited by examiner

*Primary Examiner* — Alexandre F Ferre
(74) *Attorney, Agent, or Firm* — Harness, Dickey & Pierce, P.L.C.

(57) ABSTRACT

Coated magnesium oxide particles having high filling efficiency and high mass-productivity and suitable for a thermal conductive filler are provided, the coated magnesium oxide particles being coated magnesium oxide particles in which the surface of magnesium oxide particles is coated with at least one of a fatty acid and a fatty acid metal salt, and wherein X in relation to particles is defined as X=[a BET specific surface area diameter calculated from a BET specific surface area of the particles]÷[$D_{50}$ of the particles], provided that $D_{50}$ is a particle diameter at 50% accumulation in a cumulative particle size distribution of the particles, the magnesium oxide particles having X of less than 0.2 and $D_{50}$ of 5 to 100 μm, and the coated magnesium oxide particles having X of 0.2 or more, $D_{50}$ of 5 to 100 μm, and oil absorption of less than 25 mL/100 g.

10 Claims, No Drawings

COATED MAGNESIUM OXIDE PARTICLES AND METHOD OF PRODUCING THE SAME, AND THERMAL CONDUCTIVE RESIN COMPOSITION

CROSS REFERENCE TO RELATED APPLICATION

This application is a continuation of International Patent Application No. PCT/JP2018/007220, having an international filing date of Feb. 27, 2018, which designated the United States, the entirety of which is incorporated herein by reference. Japanese Patent Application No. 2017-063552 filed on Mar. 28, 2017 is also incorporated herein by reference in its entirety.

BACKGROUND

The present disclosure relates to inorganic compound particles having high filling efficiency and high mass-productivity and suitable for a thermal conductive filler and coated magnesium oxide particles particularly useful among them, a method of producing them, and a thermal conductive resin composition and an electronic device using them.

LSI chips such as a CPU and a memory used in electronic devices have come to generate a large amount of heat associated with their increased speed and miniaturization and high integration thereof. This heat causes malfunctions or breakage of LSI chips themselves and peripheral electronic components thereof. Various heat dissipating methods are provided to prevent the malfunctions or breakage. An example thereof involves filling resin compositions such as a semiconductor sealant and a substrate and thermal interfaces such as a heat dissipating grease and a heat dissipating pad with a filler (thermal conductive filler) having a high thermal conductive property such as magnesium oxide (magnesia), silicon oxide (silica), and aluminum oxide (alumina) to improve thermal conductive properties and heat dissipating properties of the resin compositions, thermal interfaces, and the like. Such a resin composition is referred to as a thermal conductive resin composition.

Properties required for a thermal conductive filler are high thermal conductive properties, high insulation properties, chemical and thermal stability, high filling efficiency, high flowability, low hardness, high mass-productivity (low cost), and the like. High thermal conductive properties, high insulation properties, and chemical and thermal stability are essential for heat dissipating, preventing electronic devices from being short-circuited, and preventing electronic devices from being broken, respectively. High filling efficiency and high flowability are required because when flowability is improved, filling efficiency for resin can be improved, and when filling efficiency is improved, thermal conductive properties of a thermal conductive resin composition can be improved. Low hardness is required for reducing abrasion of facilities due to kneading at the time of filling resin with a thermal conductive filler. Mass-productivity (low cost) is obviously essential for strengthening competitiveness.

As a thermal conductive filler, magnesium oxide (magnesia) has been researched, developed, and placed on the market. Magnesium oxide has higher thermal conductivity, a higher melting point, and lower hardness than silicon oxide (silica) and aluminum oxide (alumina) and therefore is beneficial.

However, on absorbing moisture in the air, magnesium oxide changes to magnesium hydroxide resulting in not only loss of characteristics of magnesium oxide but also expansion that may cause breakage of electronic devices. JP-A-6-171928 describes treating the surface of magnesium oxide with a silane coupling agent to reduce hygroscopicity thereof. However, filling efficiency and flowability of such magnesium oxide are still poor.

As a method for improving filling efficiency and flowablity of magnesium oxide, WO2005/033214 describes spheroidized coated magnesium oxide powder with the surface thereof having been subjected to melting spheroidization treatment. In addition, JP-A-2016-088838 describes magnesium oxide particles having a high sphericity obtained by splay drying magnesium hydroxide slurry to cause granulation followed by calcination at 1000° C. to 1500° C. However, they are not suitable for mass production and have a problem that their costs increase.

DESCRIPTION OF EXEMPLARY EMBODIMENTS

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Some aspects of the disclosure aim at providing inorganic compound particles having high filling efficiency and high mass-productivity and suitable for a thermal conductive filler and coated magnesium oxide particles particularly useful among them, a method of producing them, and a thermal conductive resin composition and an electronic device using them.

(1) A first aspect of the disclosure relates to coated inorganic compound particles in which the surface of inorganic compound particles is coated with at least one of a fatty acid and a fatty acid metal salt, wherein X in relation to particles is defined as X=[a BET specific surface area diameter calculated from a BET specific surface area of the particles]÷[$D_{50}$ of the particles], provided that $D_{50}$ is a particle diameter at 50% accumulation in a cumulative particle size distribution of the particles, the inorganic compound particles have X of less than 0.2 and $D_{50}$ of 5 to 100 μm, and the coated inorganic compound particles have X of 0.2 or more, $D_{50}$ of 5 to 100 μm, and oil absorption of less than 25 mL/100 g.

Inorganic compound particles having X of less than 0.2 and $D_{50}$ of 5 to 100 μm have a specific surface area larger than spherical particles, and friction between particles and voids between particles are also large, and therefore such inorganic compound particles usually have low filling efficiency and low flowability. Filling efficiency and flowability of coated inorganic compound particles can be easily improved without spheroidizing inorganic compound particles by coating the surface of such inorganic compound particles with at least one of a fatty acid and a fatty acid metal salt to provide coated inorganic compound particles having X of 0.2 or more, $D_{50}$ of 5 to 100 μm, and oil absorption of less than 25 mL/100 g. As X in relation to particles gets closer to one, particles approximate true spheres, and it is meant that the smaller the oil absorption is, the higher the filling efficiency for resin becomes.

(2) In the first aspect of the disclosure, the inorganic compound particles are preferably magnesium oxide particles. Magnesium oxide particles have high thermal conductive properties, a high melting point, and low hardness, and is useful as a thermal conductive filler.

(3) In the first aspect of the disclosure, a raw material of the magnesium oxide particles is preferably a magnesia clinker (dead burned magnesia). Magnesia clinkers are massively used as refractory materials of a kiln for calcining cement and a steelmaking furnace and are low in cost. The magnesia clinker herein is a sintered body of magnesium oxide obtained by calcining magnesium hydroxide or magnesium carbonate at 1600 to 2200° C. using a rotary kiln or a shaft kiln.

(4) In the first aspect of the disclosure, it is preferable that the fatty acid is stearic acid, and the fatty acid metal salt is one or two or more selected from magnesium stearate, calcium stearate, and zinc stearate. As a result of using them for surface coating, filling efficiency and flowability of the coated inorganic compound particles can be further improved.

(5) In the first aspect of the disclosure, the surface of the inorganic compound particles is preferably surface-treated with a silane coupling agent. Surface treatment with a silane coupling agent can reduce hygroscopicity of the inorganic compound particles.

(6) In the first aspect of the disclosure, the silane coupling agent can be appropriately selected according to an object to be filled, but preferably includes at least one selected from a vinyl group, an amino group, a phenyl group, and derivatives of these substituents.

(7) In the first aspect of the disclosure, a percentage of mass increase after 48 hours under 85° C.-85% RH environment is preferably 1% or less.

(8) A second aspect of the disclosure relates to a thermal conductive resin composition including the coated inorganic compound particles of the first aspect filled in a resin. Since filling efficiency of the coated inorganic compound particles can be improved without spheroidizing the inorganic compound particles, thermal conductive properties of the thermal conductive resin composition can be improved at low cost.

(9) A third aspect of the disclosure relates to an electronic component including the thermal conductive resin composition of the second aspect. By virtue of including the thermal conductive resin composition of the second aspect, thermal conductive properties of the electronic component can be improved at low cost.

(10) A fourth aspect of the disclosure relates to an electronic device including the electronic component of the third aspect. By virtue of including the electronic component of the third aspect, thermal conductive properties of the electronic device can be improved at low cost. Accordingly, malfunctions and breakage of its electrical components themselves and peripheral electronic components thereof can be prevented at low cost.

(11) A fifth aspect of the disclosure relates to a method of producing coated inorganic compound particles, the method including a coating step of adding at least one of a fatty acid and a fatty acid metal salt to inorganic compound particles having X of less than 0.2 and $D_{50}$ of 5 to 100 μm, where X in relation to particles is defined as X=[a BET specific surface area diameter calculated from a BET specific surface area of the particles]÷[$D_{50}$ of the particles], provided that $D_{50}$ is a particle diameter at 50% accumulation in a cumulative particle size distribution of the particles, followed by mixing at 100 to 200° C. to obtain coated inorganic compound particles in which the surface of the inorganic compound particles is coated with at least one of the fatty acid and the fatty acid metal salt. According to the producing method of the fifth aspect of the disclosure, the coated inorganic compound particles according to the first aspect of the disclosure can be suitably produced.

(12) In the fifth aspect of the disclosure, the inorganic compound particles are preferably magnesium oxide particles and it is further preferable that a raw material of the magnesium oxide particles is a magnesia clinker. In addition, in the fifth aspect of the disclosure, it is preferable that the fatty acid is stearic acid and the fatty acid metal salt is one or two or more selected from magnesium stearate, calcium stearate, and zinc stearate. In addition, in the fifth aspect of the disclosure, it is preferable that the method further includes, before the coating step, a surface treatment step of adding a silane coupling agent to the inorganic compound particles followed by mixing to surface-treat the surface of the inorganic compound particles with the silane coupling agent. In addition, in the fifth aspect of the disclosure, the silane coupling agent preferably includes at least one selected from a vinyl group, an amino group, a phenyl group, and derivatives of these substituents. According to the preferred producing method of the fifth aspect of the disclosure, the coated inorganic compound particles according to the first aspect of the disclosure can be produced with the above described preferred aspects.

(13) In the fifth aspect of the disclosure, it is preferable that the method further includes, before the coating step, a provision step of providing the inorganic compound particles by pulverizing and classifying an inorganic compound raw material. Since particles obtained by pulverization generally have shapes significantly different from true spheres, inorganic compound particles having X of less than 0.2 and $D_{50}$ of 5 to 100 μm can be readily provided. When the provision step and the surface treatment step coexist, the surface treatment step is preferably carried out after the provision step. Hygroscopicity of the coated magnesium oxide particles can be reduced by surface-treating the pulverized surface of the magnesium oxide particles exposed by the pulverization in the provision step with a silane coupling agent.

Examples of the inorganic compound particles include oxide particles including silicon oxide (silica) particles, magnesium oxide (magnesia) particles, and aluminum oxide (alumina) particles; carbonate particles including magnesium carbonate particles, calcium carbonate particles, and strontium carbonate particles; hydroxide particles including magnesium hydroxide particles and aluminum hydroxide particles; nitride particles including silicon nitride particles and aluminum nitride particles; carbide particles including silicon carbide particles; and the like. Hereinbelow, magnesium oxide particles that are a preferable embodiment (the present embodiment) of the disclosure among other inorganic compound particles are described in detail.

The embodiment described below does not limit the contents of the disclosure recited in the claims, and all constituents described in the embodiment are not always essential as solution to the problem of the disclosure. In addition, in an aspect of coating, at least a part of the surface of the particles may be coated. In addition, $D_{50}$ is a particle diameter at 50% accumulation in a cumulative particle size distribution of the particles and also referred to as an average particle diameter or a median diameter. In the embodiment, $D_{50}$ was measured by laser diffraction scattering method using a particle size distribution measuring apparatus.

(1) Coated Magnesium Oxide Particles

The coated magnesium oxide particles of the embodiment are coated magnesium oxide particles in which the surface of magnesium oxide particles is coated with at least one of a fatty acid and a fatty acid metal salt, wherein X in relation to particles is defined as X=[a BET specific surface area diameter calculated from a BET specific surface area of the particles]÷[$D_{50}$ of the particles], provided that $D_{50}$ is a particle diameter at 50% accumulation in a cumulative particle size distribution of the particles, the magnesium oxide particles have X of less than 0.2 and $D_{50}$ of 5 to 100 µm, and the coated magnesium oxide particles have X of 0.2 or more, $D_{50}$ of 5 to 100 µm, and oil absorption of less than 25 mL/100 g. The magnesium oxide particles having X of less than 0.2 and $D_{50}$ of 5 to 100 µm have a specific surface area larger than spherical particles, and friction between particles and voids between particles are also large, and therefore such magnesium oxide particles usually have low filling efficiency and low flowability. Filling efficiency and flowability of coated magnesium oxide particles can be easily improved without spheroidizing the magnesium oxide particles by coating the surface of such magnesium oxide particles with at least one of a fatty acid and a fatty acid metal salt to provide coated magnesium oxide particles having X of 0.2 or more, $D_{50}$ of 5 to 100 µm, and oil absorption of less than 25 mL/100 g. As X in relation to particles gets closer to one, particles approximate true spheres, and it is meant that the smaller the oil absorption is, the higher the filling efficiency for resin becomes.

The magnesium oxide particles have X of less than 0.2, and X is preferably in a range of 0.05 to 0.15, more preferably in a range of 0.05 to 0.12, and still more preferably in a range of 0.05 to 0.1. Magnesium oxide within these ranges can be easily obtained by a commonly used pulverization method and therefore are highly economical. In addition, $D_{50}$ of the magnesium oxide particles is preferably 10 to 80 µm, more preferably 10 to 60 µm, and still more preferably 10 to 50 µm. Flowability and filling efficiency of the magnesium oxide particles can be improved thereby. Further, a raw material of the magnesium oxide particles is preferably a magnesia clinker. Magnesia clinkers are massively used as refractory raw materials of a kiln for calcining cement and a steelmaking furnace and are low in cost.

The coated magnesium oxide particles preferably have X of 0.25 or more, and X is more preferably in a range of 0.3 to 0.7, and still more preferably in a range of 0.3 to 0.5. Within these ranges, magnesium oxide particles obtained by a commonly used pulverization method can be used, and mass-productivity thereof can be maintained and improved in terms of economics. As X of the coated magnesium oxide particles gets closer to one of true spheres, flowability and filling efficiency can be improved. In addition, $D_{50}$ of the coated magnesium oxide particles is preferably 10 to 80 µm, more preferably 10 to 60 µm, and still more preferably 10 to 50 µm. Further, oil absorption of the coated magnesium oxide particles is preferably 23 mL/100 g or less, more preferably 22 mL/100 g or less, and still more preferably 21 mL/100 g or less. The smaller the oil absorption, the larger amount of coated magnesium oxide particles can be filled in a resin, and thermal conductive properties of a thermal conductive resin composition can be improved.

The fatty acid is preferably stearic acid, and the fatty acid metal salt is preferably one or two or more selected from magnesium stearate, calcium stearate, and zinc stearate.

The surface of the magnesium oxide particles is preferably surface-treated with a silane coupling agent, further with a silane coupling agent including at least one selected from a vinyl group, an amino group, a phenyl group, and derivatives of these substituents. In addition, a percentage of mass increase of the coated magnesium oxide particles after 48 hours under 85° C.-85% RH environment is preferably 1% or less, more preferably 0.5% or less, still more preferably 0.3% or less, and particularly preferably 0.25% or less.

(2) Producing Method of Coated Magnesium Oxide Particles

A method of producing the coated magnesium oxide particles of the embodiment includes a coating step of adding at least one of a fatty acid and a fatty acid metal salt to magnesium oxide particles having X of less than 0.2 and $D_{50}$ of 5 to 100 µm wherein X in relation to particles is defined as X=[a BET specific surface area diameter calculated from a BET specific surface area of the particles]÷[$D_{50}$ of the particles], provided that $D_{50}$ is a particle diameter at 50% accumulation in a cumulative particle size distribution of the particles, followed by mixing at 100 to 200° C. to obtain coated magnesium oxide particles in which the surface of magnesium oxide particles is coated with at least one of a fatty acid and a fatty acid metal salt. According to the method of producing coated magnesium oxide particles of the embodiment, the coated magnesium oxide particles of the embodiment can be suitably produced.

Preferred ranges of X and $D_{50}$ of the magnesium oxide particles and preferred material of the fatty acid are the same as those described in "(1) Coated Magnesium Oxide Particles." While known mixers can be used for mixing of the magnesium oxide particles and at least one of the fatty acid and the fatty acid metal salt, an apparatus in which agitating blades rotate at high speed such as Henschel mixer is preferable. A peripheral velocity of the agitating blades is preferably 5 m/s or more and more preferably 5 to 30 m/s. When the peripheral velocity is less than 5 m/s, sufficient mixing cannot be achieved, and therefore uniform coating cannot be obtained; when the peripheral velocity exceeds 30 m/s, particles or coating layers wear due to friction between particles, and therefore uniform coating cannot be obtained. A mixing temperature is preferably 120 to 180° C., more preferably 130 to 170° C., and still more preferably 140 to 160° C. A mixing time is preferably 3 minutes or more. The mixing temperature can be adjusted by heating a jacket of a mixer using electric heating or a heating medium. The surface of the magnesium oxide particles can be uniformly coated with at least one of a fatty acid or a fatty acid metal salt by these methods.

It is preferable that the method of producing coated magnesium oxide particles of the embodiment further includes, before the coating step, a surface treatment step of adding a silane coupling agent to the magnesium oxide particles followed by mixing to surface-treat the surface of the magnesium oxide particles with the silane coupling agent. Preferred material of the silane coupling agent is the same as those described in "(1) Coated Magnesium Oxide Particles." An apparatus used to mix the magnesium oxide particles and the silane coupling agent may be the same as the apparatus used to mix the magnesium oxide particles and at least one of the fatty acid and the fatty acid metal salt. A mixing temperature is preferably room temperature. A mixing time is preferably 3 minutes to 60 minutes, more preferably 3 minutes to 30 minutes, and still more preferably 3 minutes to 15 minutes. When the mixing time is less than 3 minutes, it is difficult to carry out sufficient mixing, and uniform coating cannot be obtained. In addition, when the mixing time exceeds 60 minutes, wear of particles or coating layers due to friction between particles becomes pronounced, and uniform coating cannot be obtained. Hygroscopicity of the magnesium oxide particles can be reduced through these steps.

It is preferable that the method of producing coated magnesium oxide particles of the embodiment further includes, before the coating step, a provision step of providing the magnesium oxide particles by pulverizing and classifying a magnesium oxide raw material. Apparatuses used for pulverization and classification of the magnesium oxide raw material are not particularly limited as long as a required particle size distribution can be obtained, and known pulverizing apparatuses and classifying apparatuses can be used. A hammer pulverizing apparatus, a roll pulverizing apparatus, a ball mill, and the like can be used as a pulverizing apparatus, for example. An apparatus using a ceramic such as zirconia for media or a liner is preferable as a pulverizing apparatus from a viewpoint of reducing contamination. A vibrating screen, an air classifier, and the like can be used as a classifying apparatus, for example. Magnesium oxide particles having X of less than 0.2 and $D_{50}$ of 5 to 100 μm can be easily provided through these steps.

In the method of producing coated magnesium oxide particles of the embodiment, when the provision step and the surface treatment step coexist, the surface treatment step is preferably carried out after the provision step. Hygroscopicity of the coated magnesium oxide particles can be reduced by surface-treating the pulverized surface of the magnesium oxide particles exposed by the pulverization in the provision step with a silane coupling agent.

(3) Application of Coated Magnesium Oxide Particles

In the thermal conductive resin composition of the embodiment, the coated magnesium oxide particles of the embodiment are filled in a resin. The coated magnesium oxide particles of the embodiment are capable of improving filling efficiency of the magnesium oxide particles without spheroidizing the magnesium oxide particles, and therefore, thermal conductive properties of the thermal conductive resin composition can be improved at low cost. The resin can be appropriately selected from known resins such as a silicone resin or an epoxy resin, a nylon resin, and the like according to applications, for example. In addition, since a thermal interface of the embodiment includes the coated magnesium oxide particles of the embodiment, thermal conductive properties of the thermal interface can be improved at low cost. Examples of the thermal interface can include a heat dissipating grease, a heat dissipating pad, and the like.

Since an electronic component of the embodiment includes the thermal conductive resin composition of the embodiment, thermal conductive properties of the electronic component can be improved at low cost. Examples of the electronic component can include an LSI chip, a substrate, and the like.

Since an electronic device of the embodiment includes the electronic component of the embodiment, thermal conductive properties of the electronic device can be improved at low cost. Therefore, malfunctions and breakage of the electrical component itself and peripheral electronic components thereof can be prevented at low cost. Examples of the electronic device can include a personal computer, a smartphone, a digital camera, an LED bulb, and the like.

Hereinbelow, examples of the disclosure will be described in detail; however, they do not limit objects of the disclosure.

(1) EXAMPLES (1-1) Example 1

Magnesia clinker UBE995S (MgO, purity 99.5%) from Ube Material Industries, Ltd. was used as a magnesium oxide raw material. The magnesia clinker was crushed by a roll crusher and pulverized by a vibration mill using zirconia balls to obtain pulverized powder. The pulverized powder was sieved with a mesh size of 45 μm and classified by a wind power classifier with a classification point of 20 μm, and the coarse powder side was collected to provide magnesium oxide particles (provision step). The magnesium oxide particles had $D_{50}$ of 26 μm. Into a mixer, 200 g of the magnesium oxide particles were charged, 1 g of magnesium stearate was added thereto, and the mixture was heated to 150° C. while being mixed at a peripheral velocity of 10 m/s and kept for 10 minutes. Then, the mixture was cooled to obtain coated magnesium oxide particles in which the surface of magnesium oxide particles was coated with magnesium stearate (coating step).

(1-2) Example 2

After 200 g of the magnesium oxide particles obtained in the provision step of Example 1 were charged into a mixer, 1 g of vinylsilane was added thereto, the mixture was mixed at a peripheral velocity of 10 m/s for 5 minutes, and the surface of the magnesium oxide particles was surface-treated with vinylsilane (surface treatment step). The same coating step as Example 1 was carried out thereafter.

(1-3) Example 3

Example 3 was conducted in the same manner as in Example 2 except that magnesium stearate in the coating step was changed to calcium stearate.

(1-4) Example 4

Example 4 was conducted in the same manner as in Example 2 except that magnesium stearate in the coating step was changed to zinc stearate.

(1-5) Example 5

Example 5 was conducted in the same manner as in Example 2 except that magnesium stearate in the coating step was changed to stearic acid.

(1-6) Example 6

A mixture of ethylene ethyl acrylate (EEA) resin ZE708 from Ube-Maruzen Polyethylene Co, Ltd. and 50% by volume of the coated magnesium oxide particles obtained in Example 2 was kneaded at 160° C. for 10 minutes using LABO PLASTOMILL from Toyo Seiki Seisaku-sho, Ltd. to obtain a thermal conductive resin composition in which EEA resin was filled with 50% by volume of the coated magnesium oxide particles.

(2) Comparative Examples

(2-1) Comparative Example 1

The magnesium oxide particles obtained in the provision step of Example 1 were used without change. That is, the provision step was carried out, and the surface treatment step and the coating step were not carried out.

(2-2) Comparative Example 2

Comparative Example 2 was conducted in the same manner as in Example 2 except that the coating step was not carried out. That is, the provision step and the surface treatment step were carried out.

(2-3) Comparative Example 3

Comparative Example 3 was conducted in the same manner as in Example 6 except that the coated magnesium oxide particles obtained in Example 2 were changed to the magnesium oxide particles obtained in Comparative Example 2.

(3) Evaluation Method

(3-1) Coated Magnesium Oxide Particles

Evaluations on $D_{50}$, BET specific surface areas, BET specific surface area diameters, X (BET specific surface area diameter/$D_{50}$), aerated specific gravity, packed specific gravity, repose angles, oil absorption, hygroscopicity, and flowability were conducted with respect to the coated magnesium oxide particles obtained in Examples 1 to 5 and the magnesium oxide particles obtained in Comparative Examples 1 and 2. Particle size distribution measuring apparatus MT3300 EX model from MicrotracBEL Corp. was used to measure $D_{50}$. BET specific surface areas were obtained by 1-point method. A powder characteristics tester from HOSOKAWA MICRON CORPORATION was used to measure repose angles. Oil absorption measuring apparatus S-500 from ASAHISOUKEN CORPORATION was used to measure oil absorption. Percentages of mass increase after 48 hours under 85° C.-85% RH environment (herein after referred to as "percentage of mass increase") (%) were measured to evaluate hygroscopicity. Five grams of a thermal conductive resin composition in which 50% by volume of coated magnesium oxide particles were filled in liquid epoxy resin 828EL from Mitsubishi Chemical Corporation was pressured at 50° C. and 10 MPa to be rolled, and a stretched diameter thereof was measured to evaluate flowability.

(3-2) Thermal Conductive Resin Composition

Evaluations on kneading properties (flowability) and thermal conductive properties were conducted with respect to the thermal conductive resin compositions obtained in Example 6 and Comparative Example 3. Kneading torque at the completion of kneading was measured to evaluate kneading properties (flowability). Using thermophysical property measuring apparatus TPS2500 S from Kyoto Electronics Manufacturing Co., Ltd., thermal conductivities of the thermal conductive resin compositions that were each formed into a thickness of 1 mm by rolling at 160° C. using a hot press were measured to evaluate thermal conductive properties.

(4) Evaluation Results

(4-1) Coated Magnesium Oxide Particles

Implementation conditions and evaluation results of Examples 1 to 5 and Comparative Examples 1 and 2 are shown in Table 1.

TABLE 1

| | | Example 1 | Example 2 | Example 3 | Example 4 | Example 5 | Comparative Example 1 | Comparative Example 2 |
|---|---|---|---|---|---|---|---|---|
| Implementation Conditions | Surface Treatment Step | — | Vinylsilane | Vinylsilane | Vinylsilane | Vinylsilane | — | Vinylsilane |
| | Coating Step | Mg Stearate | Mg Stearate | Ca Stearate | Zn Stearate | Stearic Acid | — | — |
| Evaluation Results | $D_{50}$ (μm) | 26 | 26 | 26 | 26 | 26 | 26 | 26 |
| | BET Specific Surface Area (m²/g) | 0.25 | 0.18 | 0.27 | 0.18 | 0.25 | 0.44 | 0.90 |
| | BET Specific Surface Area Diameter (μm) | 6.7 | 9.3 | 6.2 | 9.3 | 6.7 | 3.8 | 1.9 |
| | X (BET Specific Surface Area Diameter/$D_{50}$) | 0.26 | 0.36 | 0.24 | 0.36 | 0.26 | 0.15 | 0.07 |
| | Aerated Specific Gravity | 1.36 | 1.63 | 1.70 | 1.62 | 1.71 | 1.31 | 1.58 |
| | Packed Specific Gravity | 1.94 | 2.10 | 2.13 | 2.06 | 2.10 | 1.84 | 2.05 |
| | Increasing Rate (Packed Specific Gravity/Aerated Specific Gravity) (%) | 143 | 129 | 125 | 127 | 123 | 140 | 130 |
| | Repose Angle (°) | 48 | 44 | 43 | 43 | 46 | 38 | 32 |
| | Oil Absorption (mL/100 g) | 22 | 21 | 21 | 21 | 21 | 27 | 25 |
| | Percentage of Mass Increase under 85° C.-85% RH-48H (Hygroscopicity) (%) | 1.24 | 0.30 | 0.21 | 0.26 | 0.30 | 1.25 | 0.11 |
| | Stretched Diameter (Flowability) (mm) | 128 | 134 | 126 | 136 | 137 | 56 | 63 |

The BET specific surface area (BET specific surface area diameter) of the magnesium oxide particles before being subjected to the surface treatment step and the coating step (Comparative Example 1) was 0.44 m²/g (3.8 μm). Whereas the BET specific surface area (BET specific surface area diameter) in Comparative Example 2 in which only the surface treatment step was carried out increased (decreased) to 0.90 m²/g (1.9 μm), the BET specific surface areas (BET specific surface area diameters) in Examples 1 to 5 in each of which the coating step was carried out decreased (increased) to 0.18 to 0.27 m²/g (6.2 to 9.3 μm). Along with the above, whereas the value of X (BET specific surface area diameter/$D_{50}$), that was 0.15 in Comparative Example 1, decreased to 0.07 in Comparative Example 2 in which only the surface treatment step was carried out, the values of X increased to 0.24 to 0.36 in Examples 1 to 5 in each of which the coating step was carried out. Since as X in relation to particles gets closer to one the particles approximate true spheres, it is found that the coated magnesium oxide particles are influenced by the coating step and approximate true spheres without spheroidizing the magnesium oxide particles.

The aerated specific gravity and the packed specific gravity in Comparative Example 1 were 1.31 and 1.84, respectively, and the increasing rate (packed specific gravity/aerated specific gravity) was 140%. The aerated specific gravity and the packed specific gravity in Example 1, in which only the coating step was carried out and the surface treatment step was not carried out, were 1.36 and 1.94, respectively, and the increasing rate was 143% and was a value fairly close to that of Comparative Example 1 in which the surface treatment step was not carried out as in Example 1. On the other hand, the aerated specific gravity and the packed specific gravity in Comparative Example 2, in which only the surface treatment step was carried out, were 1.58 and 2.05, respectively, and the increasing rate was 130%. In addition, the aerated specific gravities and the packed specific gravities in Examples 2 to 5, in each of which the surface treatment step and the coating step were carried out, were 1.62 to 1.71 and 2.06 to 2.13, respectively, and the increasing rates were 123 to 129% and showed values close to that of Comparative Example 2. In view of the above, it is found that the surface treatment step strongly influences on aerated specific gravities, packed specific gravities, and their increasing rates.

Repose angles in Comparative Example 1 and Comparative Example 2 were 38° and 32°, respectively, and the repose angles decreased by carrying out the surface treatment step. In addition, the repose angle in Example 1, in which only the coating step was carried out, and the repose angles in Examples 2 to 5, in each of which the surface treatment step and the coating step were carried out, are 48° and 43 to 46°, respectively, and the repose angles decreased by carrying out the surface treatment step similarly to Comparative Example 1 and Comparative Example 2. On the other hand, the repose angle in each of Example 1 and Examples 2 to 5 greatly increased as compared to Comparative Example 1 and Comparative Example 2. In view of the above, it is found that while the surface treatment step influences on repose angles, the coating step more strongly influences on repose angles.

The oil absorption in Comparative Example 1 and the oil absorption in Comparative Example 2 were 27 mL/100 g and 25 mL/100 g, respectively, and the oil absorption decreased by about 7% by carrying out the surface treatment step. In addition, the oil absorption in Example 1, in which only the coating step was carried out, and the oil absorption in Examples 2 to 5, in each of which the surface treatment step and the coating step were carried out, were 22 mL/100 g and 21 mL/100 g, respectively, and the oil absorption decreased by about 5% by carrying out the surface treatment step. On the other hand, the oil absorption decreased in Example 1 by about 20% by carrying out the coating step as compared to that in Comparative Example 1. In addition, the oil absorption decreased in Examples 2 to 5 by about 16% by carrying out the coating step as compared to that in Comparative Example 2. The decrease in oil absorption means a decrease in amount of resin filled between particles, that is, improvement in filling efficiency of coated magnesium oxide particles filled into a resin. In view of the above, it is found that oil absorption is reduced by carrying out the coating step to improve filling efficiency of the coated magnesium oxide particles filled into a resin.

The percentage of mass increase in Comparative Example 1 is large as much as 1.25%, and the hygroscopicity in Comparative Example 1 is found to be poor. In addition, the percentage of mass increase in Example 1, in which only the coating step was carried out and the surface treatment step was not carried out, is large as much as 1.24%, and the hygroscopicity in Example 1 is found to be poor as in Comparative Example 1. On the other hand, the percentages of mass increase in Comparative Example 2 and Examples 2 to 5, in each of which the surface treatment step was carried out, are as little as 0.11% and 0.21 to 0.30%, respectively. In view of the above, it is found that hygroscopicity is reduced by carrying out the surface treatment step.

The stretched diameters in Comparative Example 1 and Comparative Example 2 were 56 mm and 63 mm, respectively, and increased by about 13% by carrying out the surface treatment step. On the other hand, the stretched diameters in Examples 1 to 5 in each of which the coating step was carried out were 126 to 137 mm and increased by about 100% by carrying out the coating step. In view of the above, it is found that flowability of a thermal conductive resin composition in which coated magnesium oxide particles are filled can be improved by carrying out the coating step.

(4-2) Thermal Conductive Resin Composition

Implementation conditions and evaluation results of Example 6 and Comparative Example 3 are shown in Table 2.

TABLE 2

| | | Example 6 | Comparative Example 3 |
|---|---|---|---|
| Implementation Conditions | Filler | Coated Magnesium Oxide Particles in Example 2 | Magnesium Oxide Particles in Comparative Example 2 |
| | Amount Filled (% by Volume) | 50 | 50 |
| | Resin | EEA | EEA |
| Evaluation Results | Kneading Torque (N · m) | 38 | 57 |
| | Thermal Conductivity (W/m · K) | 2.0 | 1.9 |

The kneading torques in Example 6 and Comparative Example 3 were 38 N·m and 57 N·m, respectively, and decreased by about 33% by carrying out the coating step. The decrease in kneading torque means improvement in kneading properties (flowability) of the magnesium oxide particles with a resin. In view of the above, it is found that kneading torques is decreased by carrying out the coating step to improve kneading properties (flowability) of the coated magnesium oxide particles with a resin.

Thermal conductivities in Example 6 and Comparative Example 3 were 2.0 W/m·K and 1.9 W/m·K, respectively, and increased by about 5% by carrying out the coating step. In view of the above, it is found that thermal conductive properties of a thermal conductive resin composition are improved by the coated magnesium oxide particles (coating step).

What is claimed is:

1. Coated magnesium oxide particles in which the surface of magnesium oxide particles is coated with at least one of a fatty acid and a fatty acid metal salt, wherein
a raw material of the magnesium oxide particles is a sintered body of magnesium oxide,
X in relation to particles is defined as X=[a BET specific surface area diameter calculated from a BET specific surface area of the particles] ÷ [$D_{50}$ of the particles], provided that $D_{50}$ is a particle diameter at 50% accumulation in a cumulative particle size distribution of the particles,
the magnesium oxide particles have X of less than 0.2 and $D_{50}$ of 5 to 100 μm, and
the coated magnesium oxide particles have X of 0.2 or more, $D_{50}$ of 5 to 100 μm, and oil absorption of less than 25 mL/100 g.

2. The coated magnesium oxide particles according to claim 1, wherein
the fatty acid is stearic acid, and the fatty acid metal salt is one or two or more selected from magnesium stearate, calcium stearate, and zinc stearate.

3. The coated magnesium oxide particles according to claim 1, wherein
the surface of the magnesium oxide particles is surface-treated with a silane coupling agent.

4. The coated magnesium oxide particles according to claim 3, wherein
the silane coupling agent includes at least one selected from a vinyl group, an amino group, a phenyl group, and derivatives of these substituents.

5. The coated magnesium oxide particles according to claim 3, wherein
a percentage of mass increase after 48 hours under 85° C.-85% RH environment is 1% or less.

6. A thermal conductive resin composition, comprising the coated magnesium oxide particles according to claim 1, filled in a resin.

7. A method of producing the coated magnesium oxide particles according to claim 1, the method comprising
a coating step of adding at least one of a fatty acid and a fatty acid metal salt to magnesium oxide particles having X of less than 0.2 and $D_{50}$ of 5 to 100 μm followed by mixing at 100 to 200° C. to obtain coated magnesium oxide particles in which the surface of the magnesium oxide particles is coated with at least one of the fatty acid and the fatty acid metal salt.

8. The method of producing coated magnesium oxide particles according to claim 7, wherein
the fatty acid is stearic acid, and the fatty acid metal salt is one or two or more selected from magnesium stearate, calcium stearate, and zinc stearate.

9. The method of producing coated magnesium oxide particles according to claim 7, further comprising, before the coating step,
a surface treatment step of adding a silane coupling agent to the magnesium oxide particles followed by mixing to surface-treat the surface of the magnesium oxide particles with the silane coupling agent.

10. The method of producing coated magnesium oxide particles according to claim 9, wherein
the silane coupling agent includes at least one selected from a vinyl group, an amino group, a phenyl group, and derivatives of these substituents.

* * * * *